United States Patent
Stevens

(10) Patent No.: US 7,311,176 B2
(45) Date of Patent: Dec. 25, 2007

(54) LADDER RETAINING ASSEMBLY

(76) Inventor: Robert B. Stevens, 213 Sunshine Dr., Amherst, NY (US) 14228

( * ) Notice: Subject to any disclaimer, the term of this patent is extended or adjusted under 35 U.S.C. 154(b) by 273 days.

(21) Appl. No.: 10/944,983

(22) Filed: Sep. 20, 2004

(65) Prior Publication Data
US 2005/0061583 A1    Mar. 24, 2005

Related U.S. Application Data

(60) Provisional application No. 60/504,760, filed on Sep. 22, 2003.

(51) Int. Cl.
*E06C 5/00*    (2006.01)
*B60P 9/00*    (2006.01)

(52) U.S. Cl. .................. 182/127; 414/462; 224/315
(58) Field of Classification Search ............ 182/127; 224/315, 317, 321, 323, 325; 414/462
See application file for complete search history.

(56) References Cited

U.S. PATENT DOCUMENTS

| | | | |
|---|---|---|---|
| 2,134,823 A | 11/1938 | Stephan | |
| 3,614,064 A | 10/1971 | Bennett | |
| 4,072,257 A | 2/1978 | Hall | |
| 4,827,742 A | 5/1989 | McDonald | |
| 5,154,258 A | 10/1992 | Krukow | |
| 5,186,588 A | 2/1993 | Sutton | |
| 5,257,710 A | 11/1993 | Cropley | |
| 5,297,912 A * | 3/1994 | Levi | 414/462 |
| 5,669,944 A | 9/1997 | Cerutti | |
| 5,782,391 A | 7/1998 | Cretcher | |
| 5,833,414 A | 11/1998 | Feldman | |
| 5,848,743 A | 12/1998 | Derecktor | |
| 5,860,576 A | 1/1999 | Duran | |
| 5,918,488 A | 7/1999 | Deeter | |
| 6,279,801 B1 | 8/2001 | Harrison | |
| 6,290,113 B1 | 9/2001 | Plyer | |
| 6,322,304 B1 * | 11/2001 | Chasen | 410/120 |
| 6,338,428 B1 | 1/2002 | Kawasaki | |
| 6,523,730 B2 | 2/2003 | Anderson | |
| 6,688,428 B2 * | 2/2004 | Carroll, Jr. | 182/127 |

* cited by examiner

*Primary Examiner*—Alvin Chin-Shue
(74) *Attorney, Agent, or Firm*—Howard J. Greenwald

(57) ABSTRACT

A ladder retaining assembly for securing a ladder or multiple ladders to a vehicle rack, the assembly includes a rail formed as a channel to receive a ladder or multiple ladders, a sleeve attached to the rail that can be easily attached and removed from a vehicle rack, and a means to secure the ladder retaining assembly and the ladder or ladders to a vehicle rack.

1 Claim, 11 Drawing Sheets

LADDER RETAINING ASSEMBLY

CROSS-REFERENCE TO RELATED PATENT APPLICATIONS

This application claims the benefit of the filing date of U.S. provisional patent application Ser. No. U.S. Ser. No. 60/504,760 filed Sep. 22, 2003.

BACKGROUND OF THE INVENTION

1. Field of the Invention

This invention relates generally to vehicle racks, and more particularly to an assembly for retaining a ladder on a vehicle rack.

2. Description of the Prior Art

The prior art has disclosed various devices for securing ladders during their transport on a motor vehicle. Reference may be had, e.g., to U.S. Pat. Nos. 2,134,823 (ladder holder), 3,614,064 (stabilizing jack structure for mobile vehicle) 4,072,257 (load carrying assembly), 4,827,742 (security assembly for vehicle roofrack), 5,154,258 (lockable ladder securing bracket), 5,186,588 (ladder rack ladder latch), 5,833,414 (ratcheting cargo load bracing bar), 5,918,488 (ladder lock) 6,290,113 (ladder rack lockdown), and 6,523,730 (locking device for ladders). The entire disclosure of each of these United States patents is hereby incorporated by reference into this specification.

By way of illustration, U.S. Pat. No. 6,523,730 discloses and claims: "A locking assembly for securing an item to a roofrack of a vehicle, comprising: a mounting bracket; a plurality of walls defining a channel, said channel disposed in said mounting bracket and extending therethrough; an elongated opening, said elongated opening disposed in one of said plurality of walls of said channel; a shaft, said shaft having a first end, a second end, a pair of side walls, and a posterior wall, said first end of said shaft positioned within said channel for slidable movement therein, said second end of said shaft being configured in a U-shape and adapted to engage the item to be secured to the roofrack; and a plurality of grooves equidistantly disposed along the posterior wall of said shaft for latching said shaft in said channel to prevent said shaft from slidable movement therein; a sheave member having a circumference, said sheave member mounted for pivotal movement to said mounting bracket; a plurality of protruding teeth disposed on said circumference of said sheave member and evenly spaced there around; a handle member mounted to said sheave member; a spring, said spring having a first end and a second end, wherein said first end is attached to said mounting bracket and said second end is attached to said handle." The entire disclosure of this patent is hereby incorporated by reference into this specification.

The ladder securing devices of the prior art are relatively complex and contain numerous parts, including in some cases teeth and springs that can wear out or fail. It is an object of the present invention to provide a ladder retaining assembly that is simple, reliable, and contains no moving parts. It is another object of the present invention to provide a ladder retaining assembly that secures a ladder or multiple ladders to a vehicle rack.

It is another object of the present invention to provide a ladder retaining assembly that can be attached to most commercially available vehicle racks with little or no modification.

It is another object of the invention to provide a ladder retaining assembly that will prevent unauthorized removal of a ladder or ladders from a vehicle rack.

It is yet another object of the invention to provide a ladder retaining assembly that can be used to retain various types of ladders (for example, an extension ladder, a step ladder, an adjustable extension ladder, a stairway ladder, a straight-sided ladder, or a scaffold trestle) to a vehicle roof rack.

These and other objects of the invention will be apparent from the discussion appearing in the remainder of this specification.

BRIEF SUMMARY OF THE INVENTION

The present invention provides a ladder retaining assembly for securing a ladder or multiple ladders to a vehicle rack; the assembly includes a rail formed as a channel to receive a ladder or multiple ladders, a sleeve attached to the rail that can be easily attached and removed from a vehicle rack, and a means to secure the ladder retaining assembly and the ladder or ladders to a vehicle rack.

BRIEF DESCRIPTION OF THE DRAWINGS

The invention will be described by reference to the following drawings, in which like numerals refer to like elements, and in which.

Figure 1:
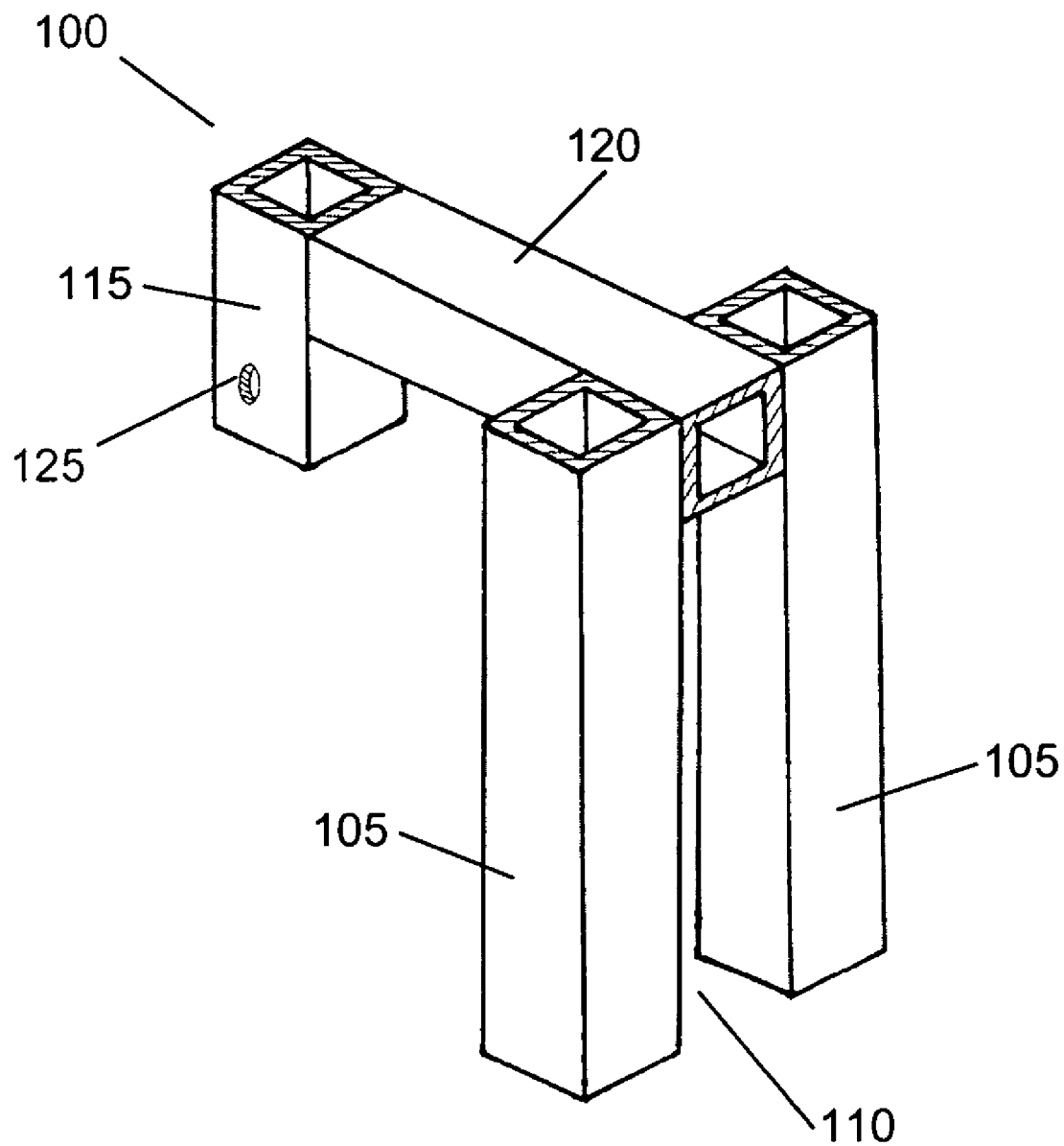
FIG. 1 is a perspective view of a one extension ladder retaining assembly according to one embodiment of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements.

FIG. 1 is a perspective view of a one extension ladder retaining assembly according to one embodiment of the present invention. Referring to FIG. 1, the extension ladder retaining assembly 100 is mounted to any commercially available roof rack (not shown in FIG. 1). Thus, by way of illustration and not limitation, one may use one or more of the "ALUMINUM ALL-PURPOSE RACKS" or "STEEL ALL-PURPOSE RACKS" of the "WEATHER GUARD" product line by the Knaack Manufacturing Company of 420 East Terra Cotta Avenue, Crystal Lake, Ill.

By way of further illustration, one may use one or more of the roof racks disclosed in U.S. Pat. Nos. 6,338,428 (vehicle roof rack), 6,279,801 (vehicle roof rack), 5,860,576 (vehicle roof rack), 5,848,743 (vehicle roof rack), 5,782,391 (vehicle roof rack), 5,669,944 (vehicle roof rack assembly), 5,257,710 (vehicle roof rack), and the like. The entire disclosure of each of these United States patents is hereby incorporated by reference into this specification.

Referring again to FIG. 1, the extension ladder retaining assembly 100 is made of a metal such as aluminum, steel, titanium, brass, copper or stainless steel. The extension ladder retaining assembly 100 may also be made of a structural plastic, fiberglass, graphite, and the like. The method of fabricating the ladder retaining assembly 100 may use welding, casting, molding, or other methods commonly known to those skilled in the art.

The extension ladder retaining assembly 100 has at least one rail 105 that is generally vertically oriented when mounted to a commercially available vehicle rack. One or more rungs of an extension ladder placed on the vehicle rack (not shown in FIG. 1) are disposed between the generally vertically oriented rails 105 to prevent movement of said extension ladder while being transported on said vehicle rack. In one embodiment of the present invention, two rails 105 are used to form a channel 110. In use, one or more rungs of an extension ladder (not shown in FIG. 1) are contained by said rails 105 to prevent movement of said extension ladder while being transported on said vehicle rack.

The extension ladder retaining assembly 100 is removably disposed on a commercially available vehicle rack by using a sleeve 115 that is placed over a vertical element of a commercially available roof rack (not shown in FIG. 1). The sleeve 115 is shaped and sized so as to receive a vertical element of a commercially available roof rack. The sleeve 115 may optionally contain holes 125 to receive a lock, pin, or other securing means.

The sleeve 115 is connected to the rails 105 by an attachment 120. The attachment 120 may vary in length depending on the type of ladder to be retained.

Figure 2:
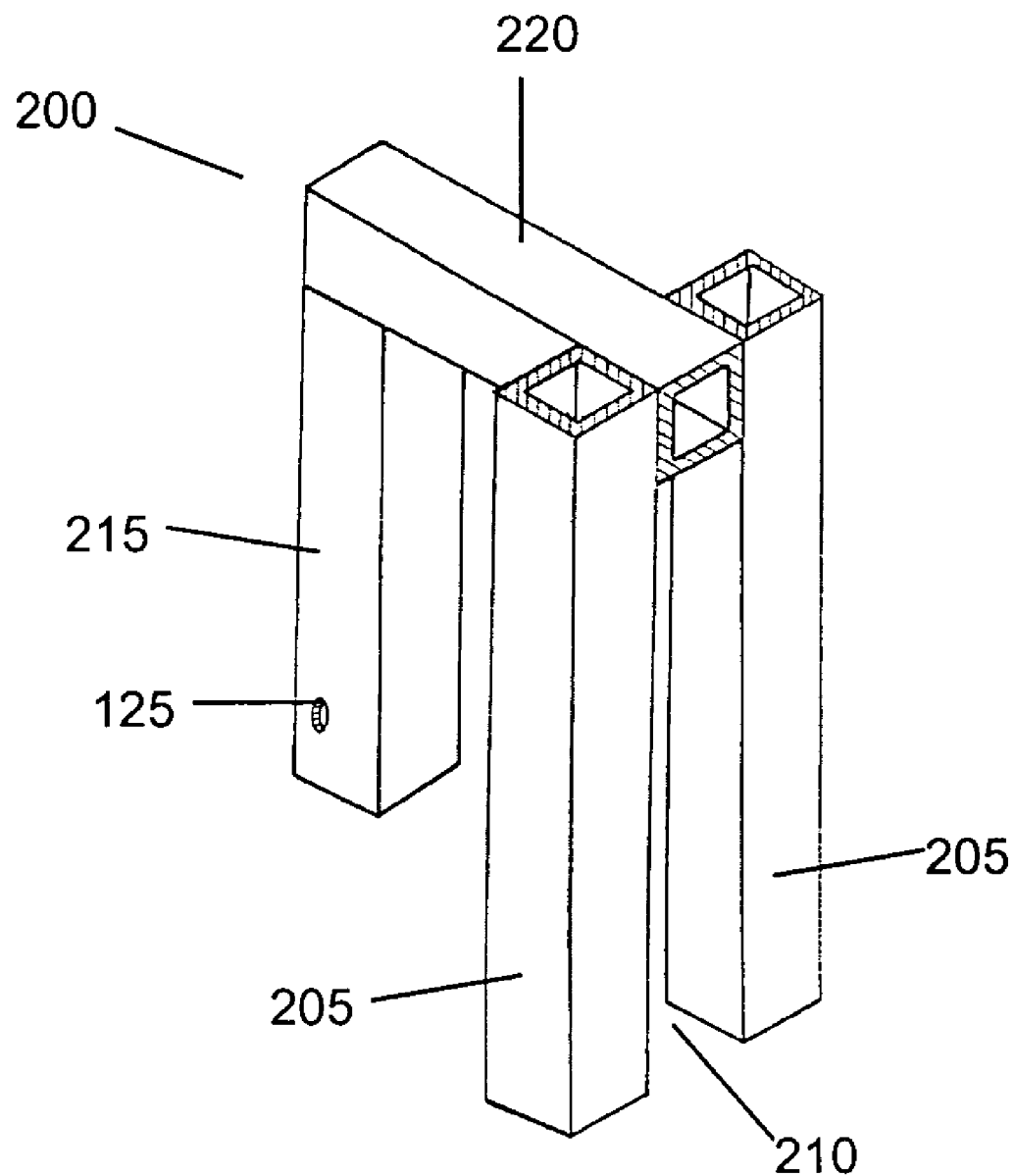
FIG. 2 is a perspective view of a two extension ladder retaining assembly according to another embodiment of the present invention.

Referring now to FIG. 2, a perspective view of a two extension ladder retaining assembly 200 is shown. This two extension ladder retaining assembly 200 allows one to stack two extension ladders on a vehicle roof rack, and securely retain both extension ladders on said vehicle roof rack. Referring to FIG. 2, the two extension ladder retaining assembly 200 is mounted to any commercially available roof rack (not shown in FIG. 2). Thus, by way of illustration and not limitation, one may use one or more of the "ALUMINUM ALL-PURPOSE RACKS" or "STEEL ALL-PURPOSE RACKS" of the "WEATHER GUARD" product line by the Knaack Manufacturing Company of 420 East Terra Cotta Avenue, Crystal Lake, Ill.

By way of further illustration, one may use one or more of the roof racks disclosed in U.S. Pat. Nos. 6,338,428 (vehicle roof rack), 6,279,801 (vehicle roof rack), 5,860,576 (vehicle roof rack), 5,848,743 (vehicle roof rack), 5,782,391 (vehicle roof rack), 5,669,944 (vehicle roof rack assembly), 5,257,710 (vehicle roof rack), and the like. The entire disclosure of each of these United States patents is hereby incorporated by reference into this specification.

Referring again to FIG. 2, the two extension ladder retaining assembly 200 is made of a metal such as aluminum, steel, titanium, brass, copper or stainless steel. The two extension ladder retaining assembly 200 may also be made of a structural plastic, fiberglass, graphite, and the like. The method of fabricating the two extension ladder retaining assembly 200 may use welding, casting, molding, or other methods commonly known to those skilled in the art.

The two extension ladder retaining assembly 200 has at least one rail 205 that is generally vertically oriented when mounted to a commercially available vehicle rack. Said rail 205 is generally longer than the rail 105 of the single extension ladder retaining assembly 100 to accommodate more than one ladder. One or more rungs of each extension ladder placed on the vehicle rack (not shown in FIG. 1) are disposed between the generally vertically oriented rails 105 to prevent movement of said extension ladder while being transported on said vehicle rack. In one embodiment of the present invention, two rails 205 are used to form a channel 210. In use, one or more rungs of each extension ladder (not shown in FIG. 2) are contained by said rails 205 to prevent movement of each extension ladder while being transported on said vehicle rack.

The ladder retaining assembly 200 is removably disposed on a commercially available vehicle rack by using a sleeve 215 that is placed over a vertical element of a commercially available roof rack (not shown in FIG. 2). The sleeve 215 is shaped and sized so as to receive a vertical element of a commercially available roof rack. The sleeve 215 may optionally contain holes 225 to receive a lock, pin, or other securing means.

The sleeve 215 is connected to the rails 205 by an attachment 220. The attachment 220 may vary in length depending on the type of ladder to be retained and the quantity of ladders to be so retained.

Figure 3:
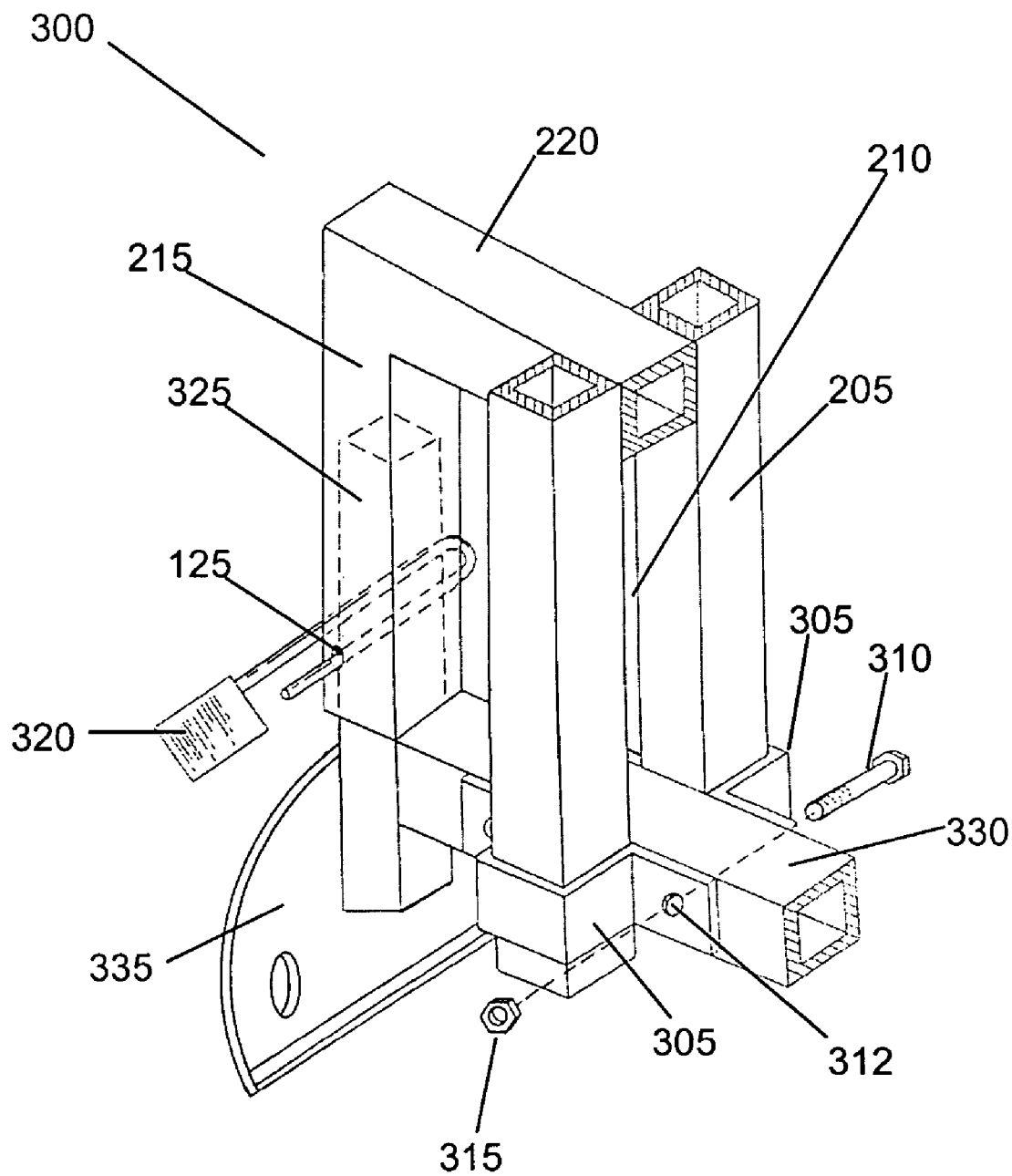
FIG. 3 is a partially exploded perspective view of a two extension ladder retaining assembly mounted to a vehicle rack that is partially broken away.

Referring now to FIG. 3, a partially exploded perspective view of a two extension ladder retaining assembly 200 is shown mounted to a vehicle rack 335. The vehicle rack 335 is partially broken away to show the attachment of the sleeve 215 to a vertical element 325 of the vehicle rack 335. FIG. 3 shows optional brackets 305 that are attached to a horizontal member 330 of said vehicle rack 335. In one embodiment of the invention, a bolt 310 and a nut 315 are used to attach said optional brackets 305 to said horizontal member 330 of said vehicle rack 335. In some instances, a hole 312 is drilled in said horizontal member 330 of said vehicle rack 335 to accommodate said bolt 310. The optional brackets 305 provide increased stability and strength to the ladder retaining assembly 220.

Referring again to FIG. 3, a padlock 320 may be inserted into hole 125 to secure the ladders as well as the ladder retaining assembly from theft.

Figure 4:
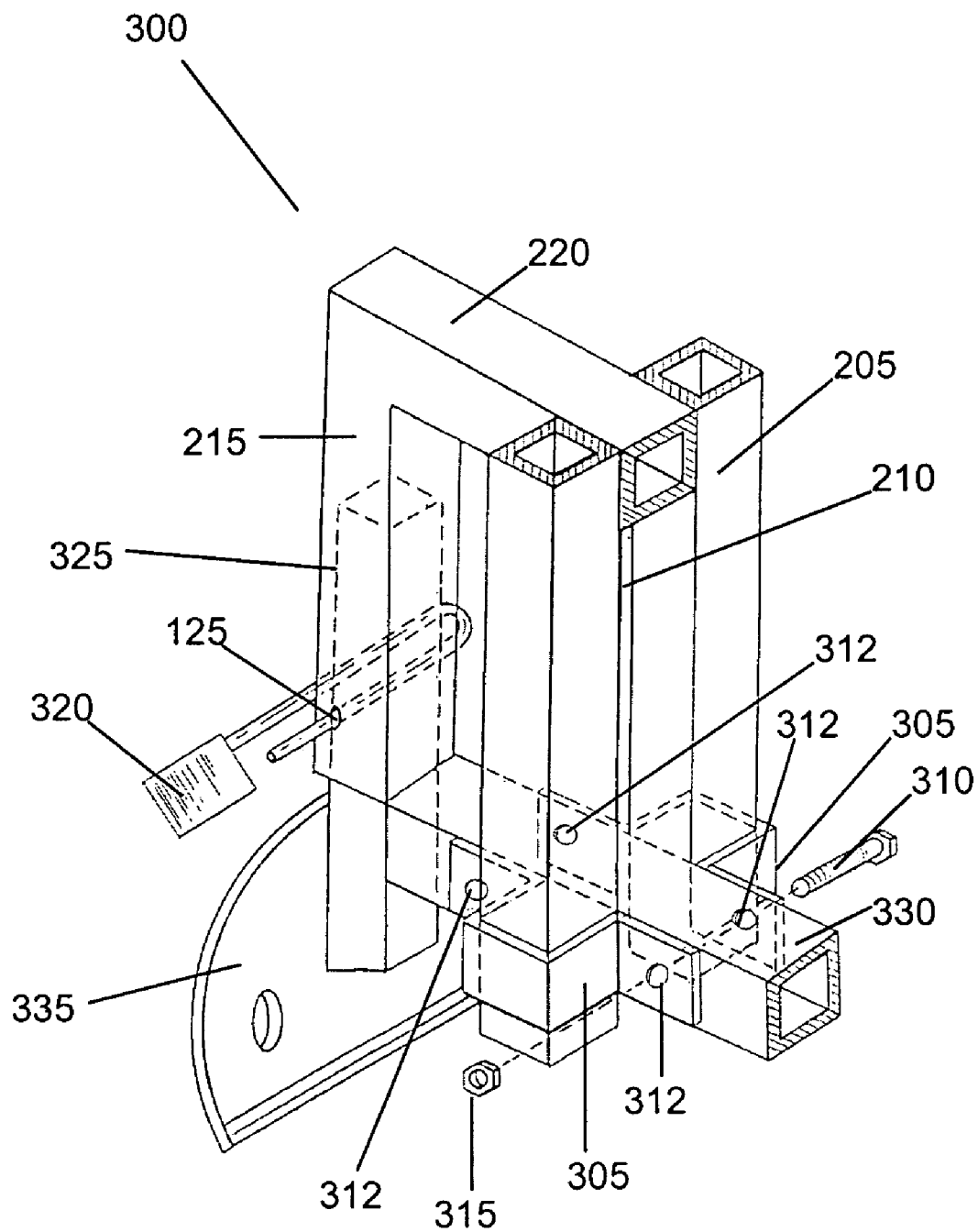
FIG. 4 is a partially exploded perspective view of a two extension ladder retaining assembly mounted to a vehicle rack that is partially broken away to show the brackets.

Referring now to FIG. 4, a partially exploded perspective view of a two extension ladder retaining assembly 300 is shown mounted to a vehicle rack 335 that is partially broken away to further show the brackets 305.

Figure 5:
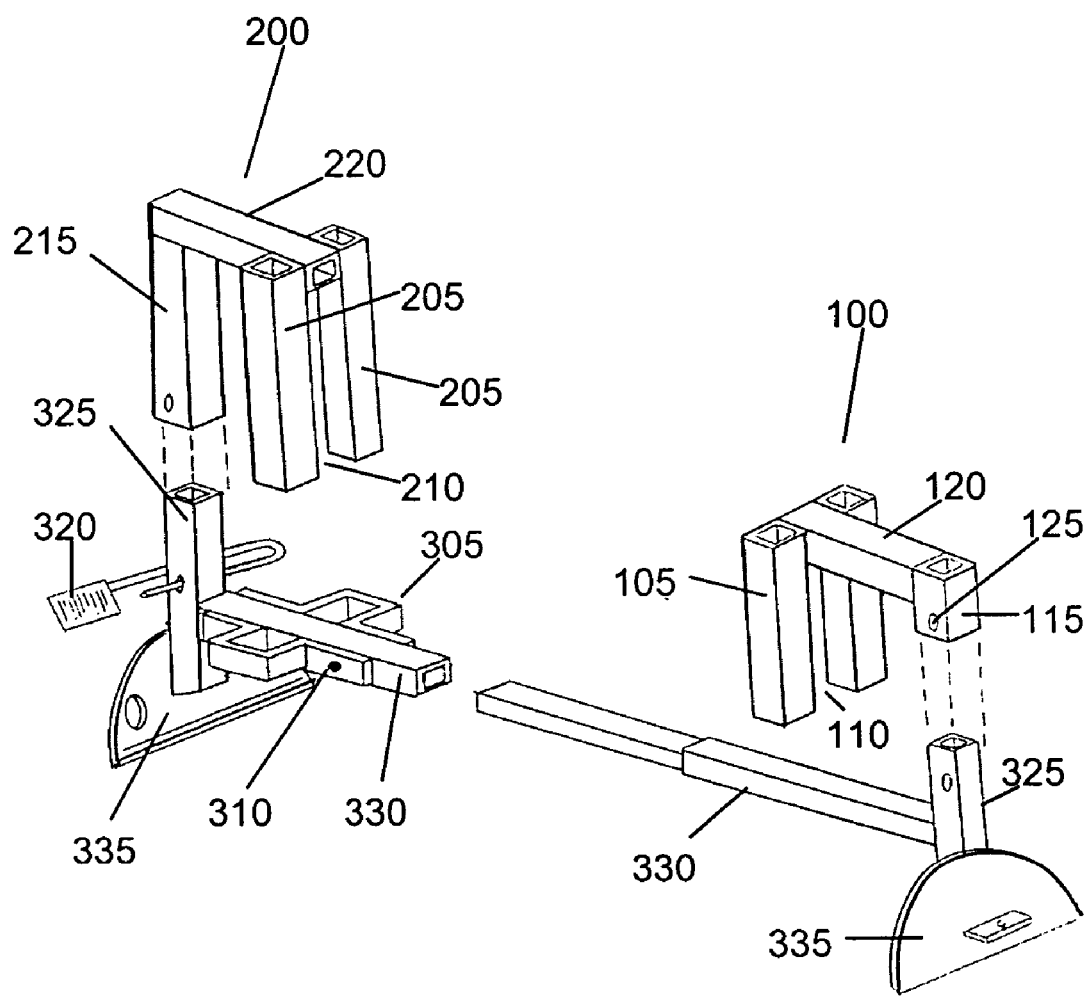
FIG. 5 is a partially exploded perspective view of both a one extension ladder retaining assembly and a two extension ladder retaining assembly attached to a vehicle rack.

FIG. 5 shows a partially exploded perspective view of both a one extension ladder retaining assembly 100 and a two extension ladder retaining assembly 200 attached to a vehicle rack 335.

Figure 6:
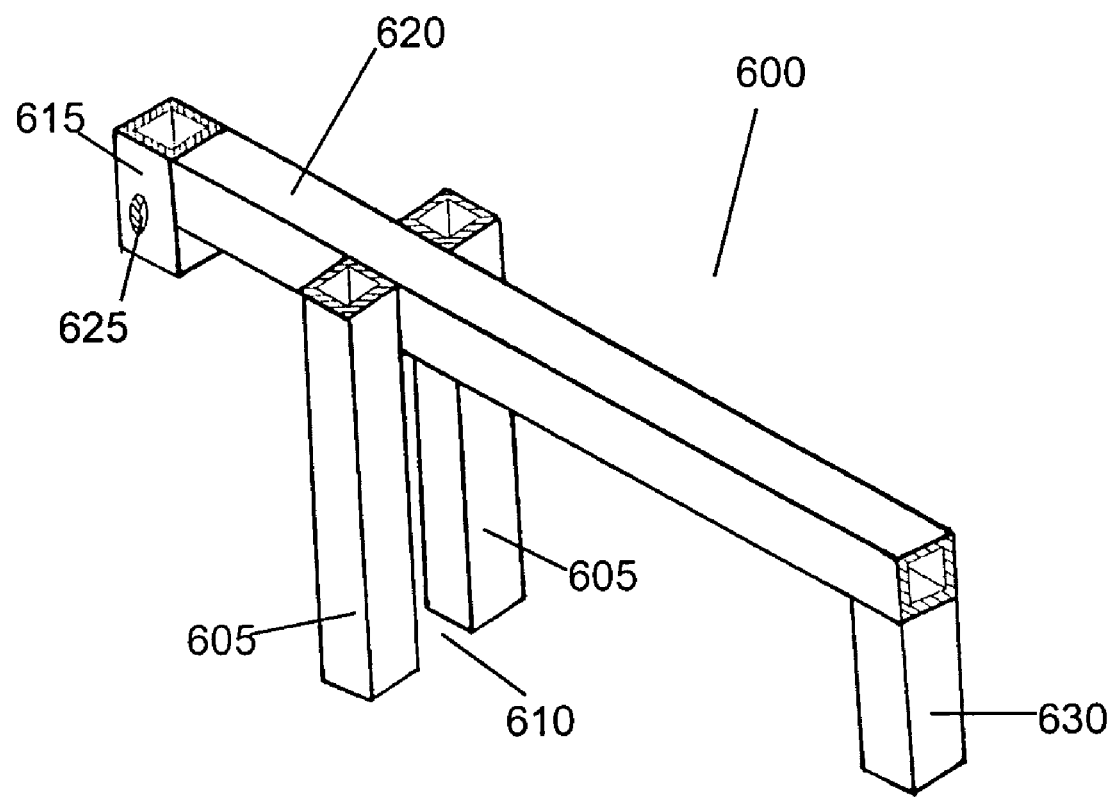
FIG. 6 is a perspective view of a long one extension ladder retaining assembly according to one embodiment of the present invention.

Referring now to FIG. 6, a long one extension ladder retaining assembly 600 is shown. This long one extension ladder retaining assembly 600 allows one to retain an extension ladder as well as a step ladder on a vehicle roof rack, and securely retain the ladders on said vehicle roof rack. Referring to FIG. 6, the long one extension ladder retaining assembly 600 is mounted to any commercially available roof rack (not shown in FIG. 6). Thus, by way of illustration and not limitation, one may use one or more of the "ALUMINUM ALL-PURPOSE RACKS" or "STEEL ALL-PURPOSE RACKS" of the "WEATHER GUARD" product line by the Knaack Manufacturing Company of 420 East Terra Cotta Avenue, Crystal Lake, Ill.

By way of further illustration, one may use one or more of the roof racks disclosed in U.S. Pat. Nos. 6,338,428 (vehicle roof rack), 6,279,801 (vehicle roof rack), 5,860,576 (vehicle roof rack), 5,848,743 (vehicle roof rack), 5,782,391 (vehicle roof rack), 5,669,944 (vehicle roof rack assembly), 5,257,710 (vehicle roof rack), and the like. The entire disclosure of each of these United States patents is hereby incorporated by reference into this specification.

Referring again to FIG. 6, the long one extension ladder retaining assembly 600 is made of a metal such as aluminum, steel, titanium, brass, copper or stainless steel. The long one extension ladder retaining assembly 600 may also be made of a structural plastic, fiberglass, graphite, and the like. The method of fabricating the long one extension ladder retaining assembly 600 may use welding, casting, molding, or other methods commonly known to those skilled in the art.

The long one extension ladder retaining assembly 600 has at least one rail 605 that is generally vertically oriented when mounted to a commercially available vehicle rack One or more rungs of the ladder placed on the vehicle rack (not shown in FIG. 6) are disposed between the generally vertically oriented rails 605 to prevent movement of said ladder while being transported on said vehicle rack. In one embodiment of the present invention, two rails 605 are used to form a channel 610. In use, one or more rungs of the ladder (not shown in FIG. 6) are contained by said rails 605 to prevent movement of the ladder while being transported on said vehicle rack.

The ladder retaining assembly 600 is removably disposed on a commercially available vehicle rack by using a sleeve 615 that is placed over a vertical element of a commercially available roof rack (not shown in FIG. 6). The sleeve 615 is shaped and sized so as to receive a vertical element of a commercially available roof rack. The sleeve 615 may optionally contain holes 625 to receive a lock, pin, or other securing means.

The sleeve 615 is connected to the rails 605 by an attachment 620. The attachment 620 may vary in length depending on the type of ladder to be retained and the quantity of ladders to be so retained. The long one extension ladder retaining assembly 600 includes an extension rail 630 mounted to the attachment 620 at a point past the attachment of said rails 605 to said attachment 620.

Figure 7:
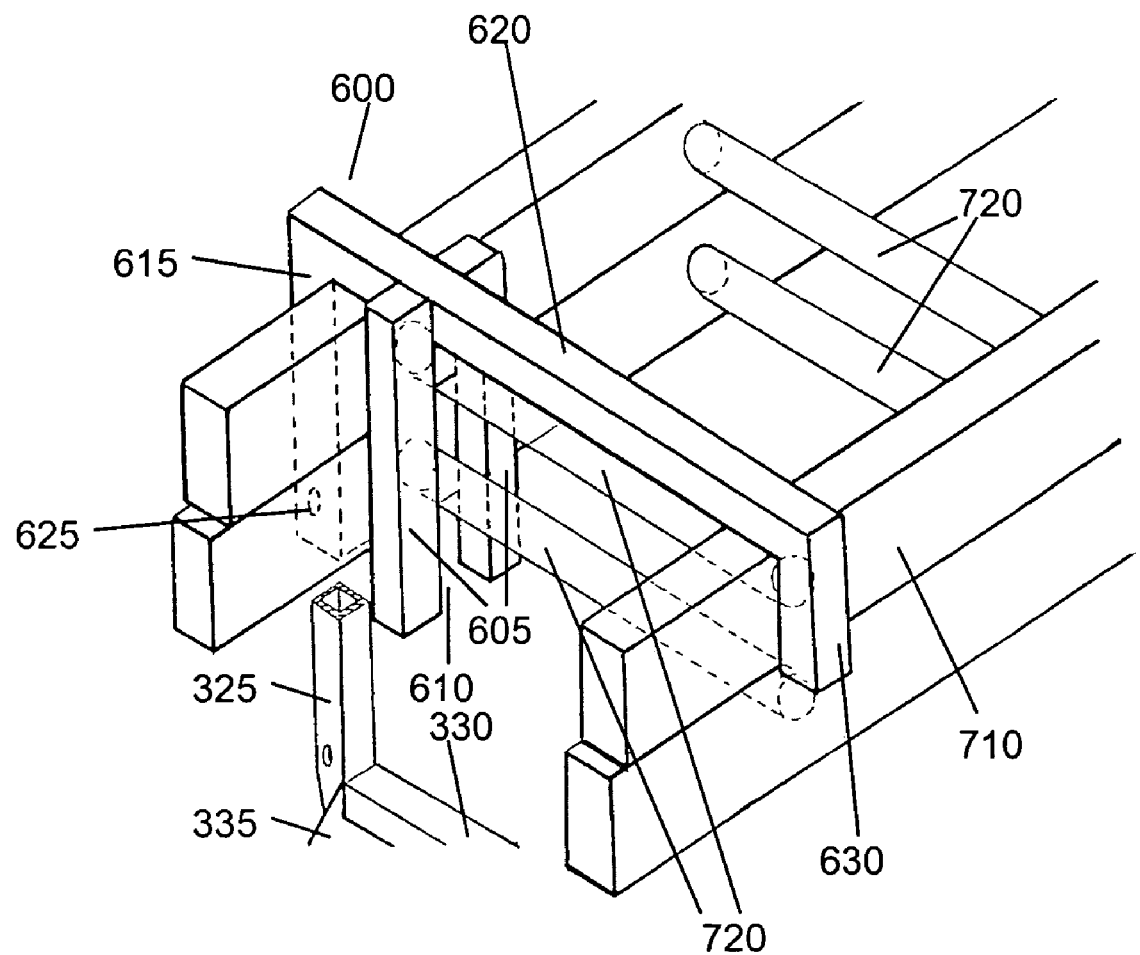
FIG. 7 illustrates the use of a long one extension ladder retaining assembly.

FIG. 7 illustrates the use of a long one extension ladder retaining assembly 600 to secure a large extension ladder 710 to a vehicle rack 335. The channel 610 is shown containing the rungs 720 of said ladder 710 to. The extension rail 630 is shown providing additional retention to the ladder 710. Said ladder 710 maybe an extension ladder, a step ladder, an adjustable extension ladder, a stairway ladder, a straight-sided ladder, or a scaffold trestle.

Figure 8:
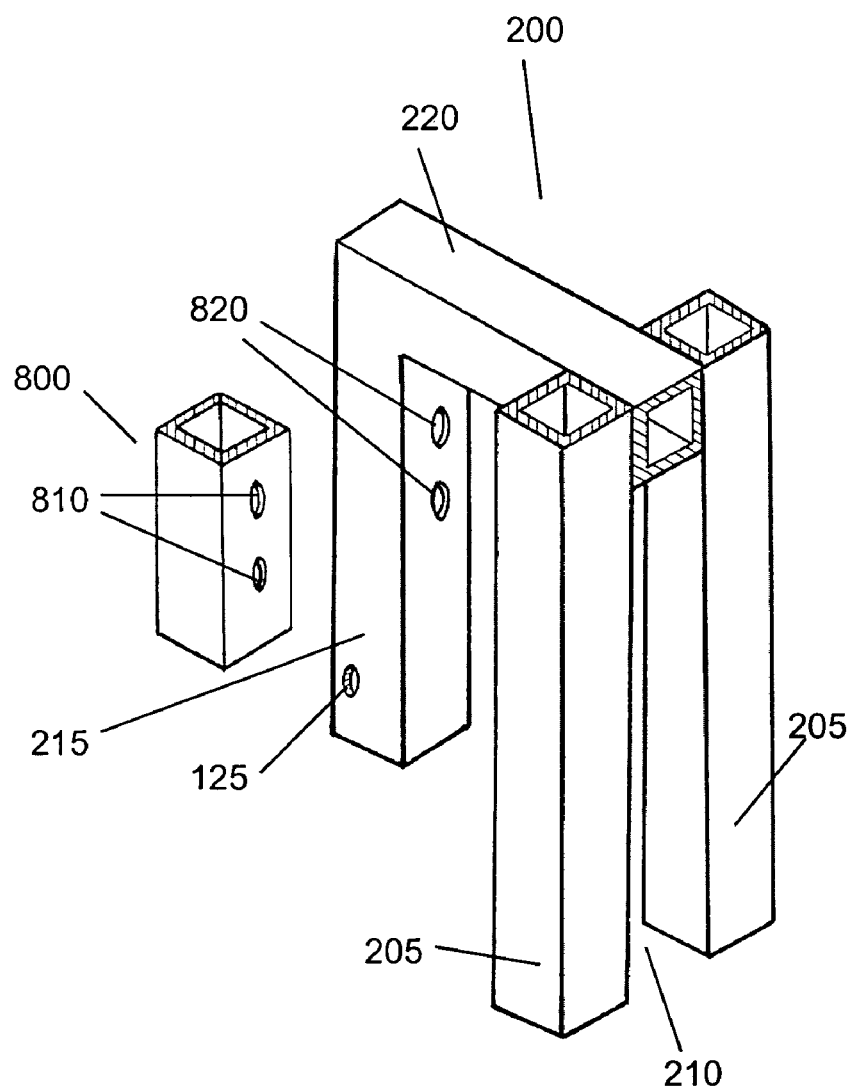
FIG. 8 is a perspective view of a two extension ladder retaining assembly shown with a converter to adapt from a two extension ladder retaining assembly to a one extension ladder retaining assembly.

Referring now to FIG. 8, a converter 800 is shown to allow conversion of a two extension ladder retaining assembly to a one extension ladder retaining assembly. The converter 800 is attached to the sleeve 215 of a two extension ladder retaining assembly 200 using mounting holes 810 and 820 and commonly available bolts or pins (not shown in FIG. 8). The converter 800 shortens the vertical travel of the sleeve 215, allowing for the use of a two extension ladder retaining assembly 200 with one ladder. The converter 800 is made of a metal such as aluminum, steel, titanium, brass, copper or stainless steel. The converter 800 may also be made of a structural plastic, fiberglass, graphite, and the like. The method of fabricating the converter 800 may use welding, casting, molding, or other methods commonly known to those skilled in the art.

Figure 9:
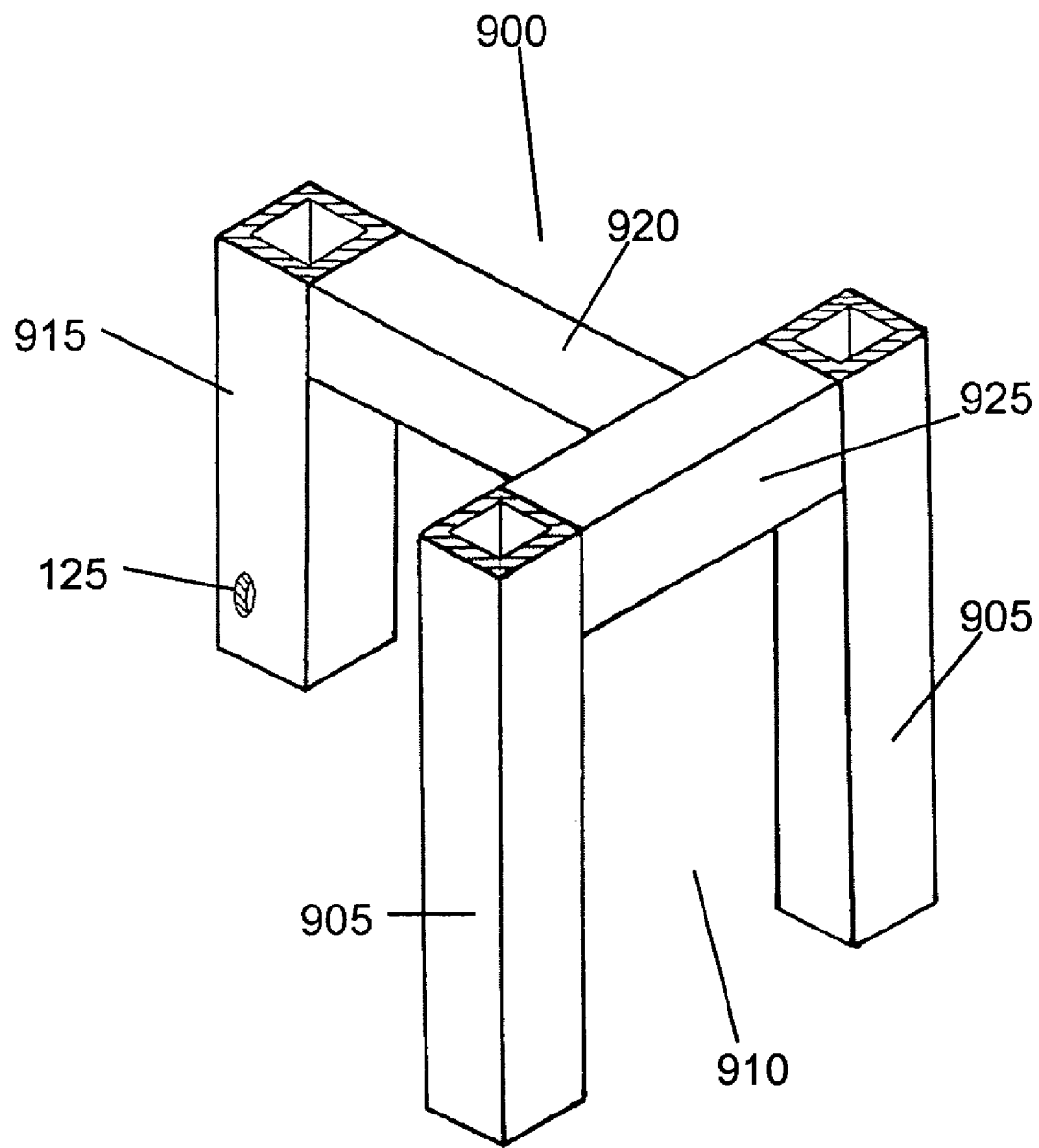
FIG. 9 is a perspective view of a stepladder retaining assembly according to one embodiment of the present invention.

FIG. 9 shows a stepladder retaining assembly 900. A common stepladder contains steps that are wider than the steps of an extension ladder. The steps of a common stepladder also vary in width, with wider steps toward the base of the stepladder, and narrower steps toward the top of the stepladder. When a stepladder is folded closed, for example, when transporting the stepladder on a vehicle rack, often times reinforcing braces of the stepladder are in close proximity to the steps of the stepladder. In FIG. 9, the stepladder retaining assembly 900 includes rails 905 that are offset by a spacer 925 to form a channel 910 that will accommodate the wider steps and associated bracing of a stepladder.

Referring again to FIG. 9, the stepladder retaining assembly 900 is mounted to any commercially available roof rack (not shown in FIG. 9). Thus, by way of illustration and not limitation, one may use one or more of the "ALUMINUM ALL-PURPOSE RACKS" or "STEEL ALL-PURPOSE RACKS" of the "WEATHER GUARD" product line by the Knaack Manufacturing Company of 420 East Terra Cotta Avenue, Crystal Lake, Ill.

By way of further illustration, one may use one or more of the roof racks disclosed in U.S. Pat. Nos. 6,338,428 (vehicle roof rack), 6,279,801 (vehicle roof rack), 5,860,576 (vehicle roof rack), 5,848,743 (vehicle roof rack), 5,782,391 (vehicle roof rack), 5,669,944 (vehicle roof rack assembly), 5,257,710 (vehicle roof rack), and the like. The entire disclosure of each of these United States patents is hereby incorporated by reference into this specification.

Referring again to FIG. 9, the stepladder retaining assembly 900 is made of a metal such as aluminum, steel, titanium, brass, copper or stainless steel. The extension ladder retaining assembly 900 may also be made of a structural plastic, fiberglass, graphite, and the like. The method of fabricating the stepladder retaining assembly 900 may use welding, casting, molding, or other methods commonly known to those skilled in the art.

The stepladder retaining assembly 900 has at least one rail 905 that is generally vertically oriented when mounted to a commercially available vehicle rack. One or more steps of a stepladder placed on the vehicle rack (not shown in FIG. 9) are disposed between the generally vertically oriented rails 905 to prevent movement of said extension ladder while being transported on said vehicle rack. In one embodiment of the present invention, two rails 905 are used to form a channel 910. In use, one or more steps of a stepladder (not shown in FIG. 1) are contained by said rails 905 to prevent movement of said stepladder while being transported on said vehicle rack.

The stepladder retaining assembly 900 is removably disposed on a commercially available vehicle rack by using a sleeve 915 that is placed over a vertical element of a commercially available roof rack (not shown in FIG. 9). The sleeve 915 is shaped and sized so as to receive a vertical element of a commercially available roof rack. The sleeve 915 may optionally contain holes 125 to receive a lock, pin, or other securing means.

The stepladder retaining assembly 900 includes rails 905 that are offset by a spacer 925 to form a channel 910 that will accommodate the wider steps and associated bracing of a stepladder. The spacer 925 is connected to the sleeve by an attachment 920. The attachment 920 may vary in length depending on the type and size of stepladder to be retained.

Figure 10:
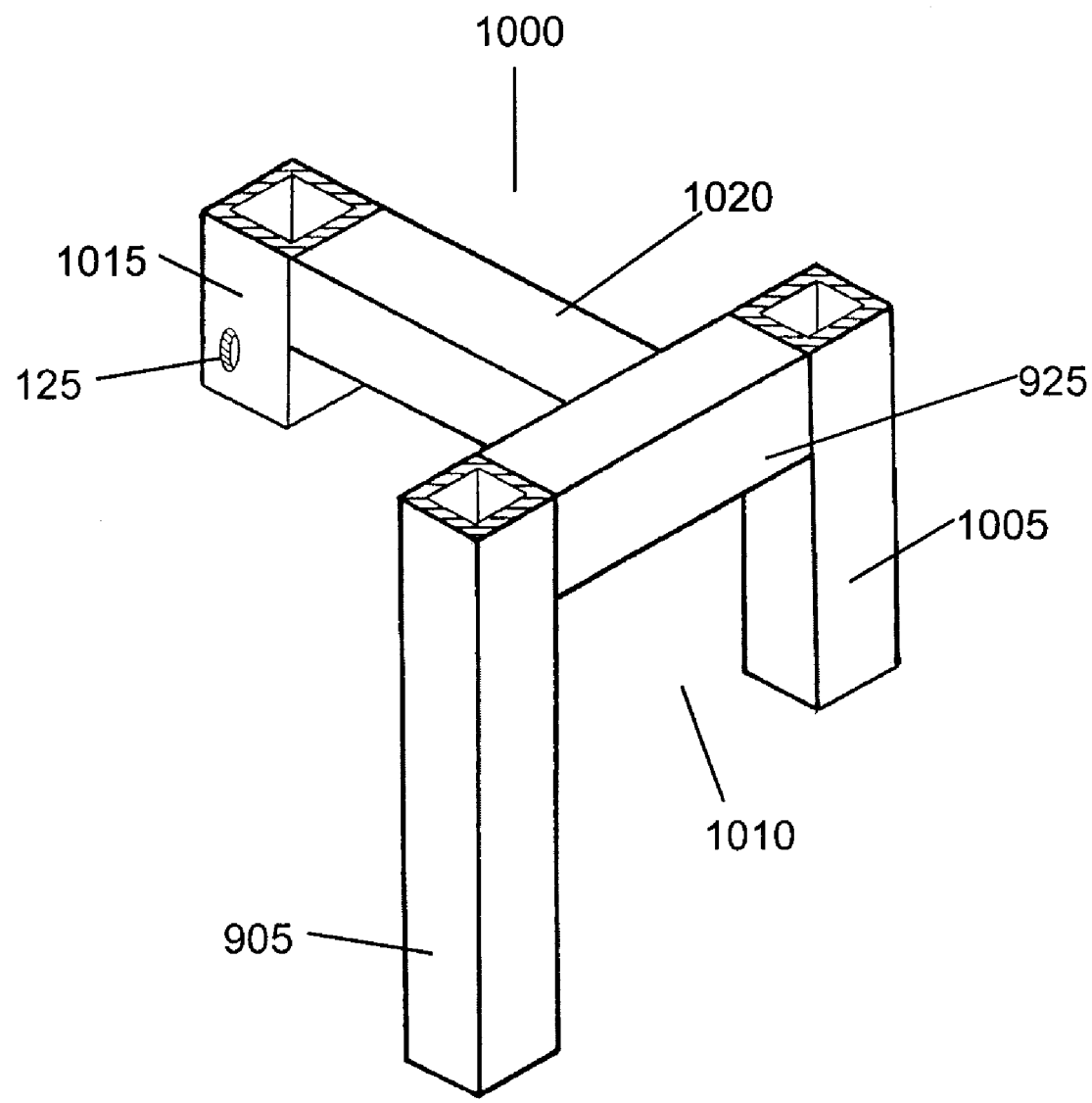
FIG. 10 is a perspective view of another stepladder retaining assembly with assymetrical rails to accommodate a stepladder with braces.

FIG. 10 shows another embodiment of a stepladder retaining assembly 1000. When a stepladder is folded closed, for example, when transporting the stepladder on a vehicle rack, often times reinforcing braces of the stepladder are in close proximity to the steps of the stepladder, and often times the bracing will interfere with the proper placement of a rail 905 of the stepladder retaining assembly 900 shown in FIG. 9. In FIG. 10, the stepladder retaining assembly 1000 includes rail 905 and a shorter rail 1005 that are offset by a spacer 925 to form a channel 1010 that will accommodate the wider steps and associated bracing of a stepladder. The shorter rail 1005 will accommodate the bracing that is present on some stepladders.

Referring again to FIG. 10, the stepladder retaining assembly 1000 is mounted to any commercially available roof rack (not shown in FIG. 10). Thus, by way of illustration and not limitation, one may use one or more of the "ALUMINUM ALL-PURPOSE RACKS" or "STEEL ALL-PURPOSE RACKS" of the "WEATHER GUARD" product line by the Knaack Manufacturing Company of 420 East Terra Cotta Avenue, Crystal Lake, Ill.

By way of further illustration, one may use one or more of the roof racks disclosed in U.S. Pat. Nos. 6,338,428 (vehicle roof rack), 6,279,801 (vehicle roof rack), 5,860,576 (vehicle roof rack), 5,848,743 (vehicle roof rack), 5,782,391 (vehicle roof rack), 5,669,944 (vehicle roof rack assembly), 5,257,710 (vehicle roof rack), and the like. The entire disclosure of each of these United States patents is hereby incorporated by reference into this specification.

Referring again to FIG. 10, the stepladder retaining assembly 1000 is made of a metal such as aluminum, steel, titanium, brass, copper or stainless steel. The extension ladder retaining assembly 1000 may also be made of a structural plastic, fiberglass, graphite, and the like. The method of fabricating the stepladder retaining assembly 1000 may use welding, casting, molding, or other methods commonly known to those skilled in the art.

The stepladder retaining assembly 1000 has at least one rail 905 that is generally vertically oriented when mounted to a commercially available vehicle rack, and at least one rail 1005 that is shorter than rail 905. One or more steps of a stepladder placed on the vehicle rack (not shown in FIG. 10) are disposed between the generally vertically oriented rail 905 and the rail 1005 to prevent movement of said extension ladder while being transported on said vehicle rack.

The stepladder retaining assembly 1000 is removably disposed on a commercially available vehicle rack by using a sleeve 1015 that is placed over a vertical element of a commercially available roof rack (not shown in FIG. 10). The sleeve 1015 is shaped and sized so as to receive a vertical element of a commercially available roof rack. The sleeve 1015 may optionally contain holes 125 to receive a lock, pin, or other securing means.

The stepladder retaining assembly 1000 includes rails 905 and 1005 that are offset by a spacer 925 to form a channel 1010 that will accommodate the wider steps and associated bracing of a stepladder. The spacer 925 is connected to the sleeve 1015 by an attachment 1020. The attachment 1020 may vary in length depending on the type and size of stepladder to be retained.

Figure 11:
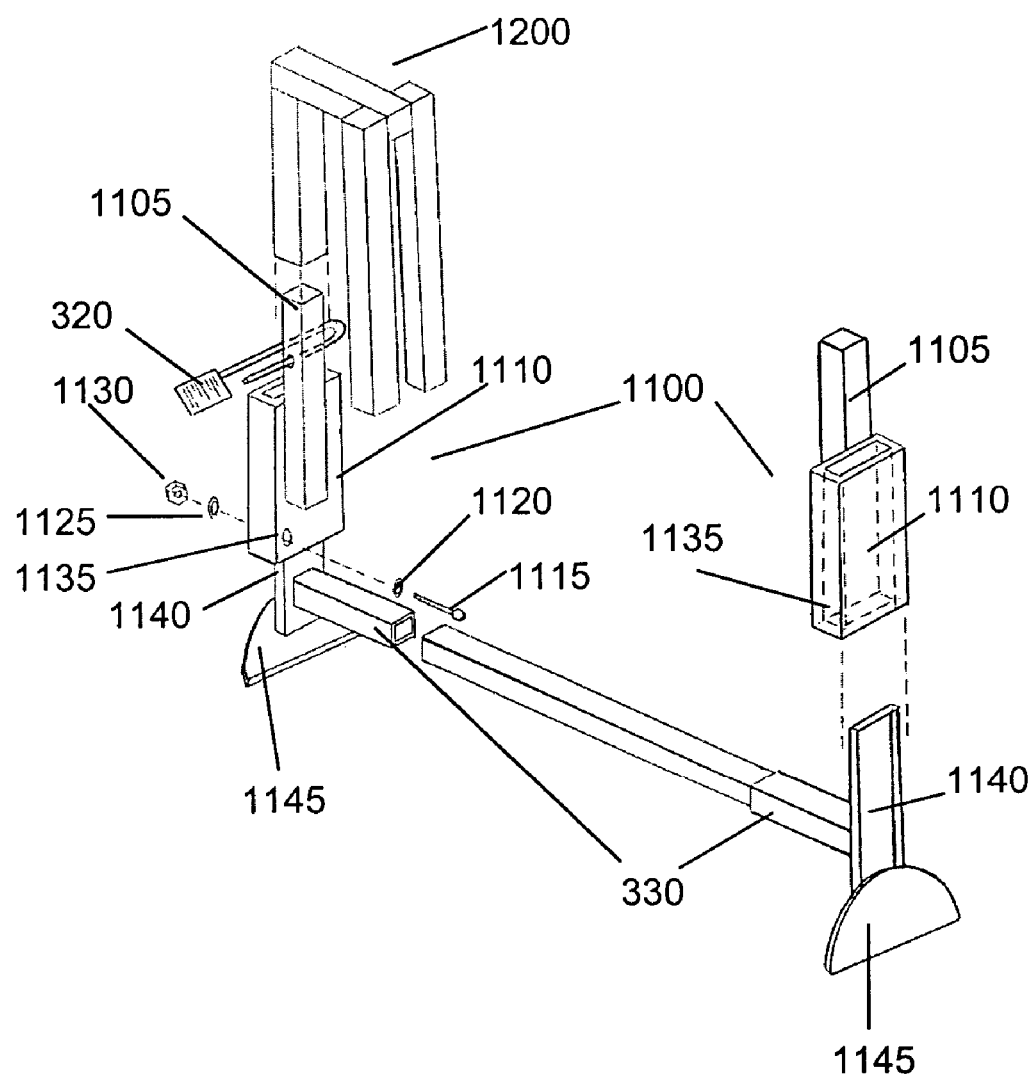
FIG. 11 is a partially exploded perspective view of a ladder retaining assembly shown with a converter to allow for the attachment of a ladder retaining assembly to a non-standard vehicle rack.

Referring now to FIG. 11, a ladder retaining assembly 1200 is shown with a vertical post adapter 1100 to allow for the attachment of a ladder retaining assembly 1200 to a non-standard vehicle rack. Ladder retaining assembly 1200 may be a ladder retaining assembly for an extension ladder, a step ladder, an adjustable extension ladder, a stairway ladder, a straight-sided ladder, or a scaffold trestle. A non-standard vehicle rack is defined as a vehicle rack that will not accommodate said ladder retaining assembly without modification.

The vehicle rack 1145 that is shown in FIG. 11 contains a non-standard vertical element 1140. The non-standard vertical element 1140 shown is rectangular, but other non-standard vertical element shapes that may be present in vehicle roof racks, such as round elements, octagonal elements, flat elements, and the like, may also be adapted for use with the ladder retaining assembly. The vertical post adapter 1100 comprises an adapter sleeve 1110 that is shaped and sized so as to receive a non-standard vertical element of a commercially available roof rack. Attached to the adapter sleeve 1110 is a vertical post 1105 that is shaped and sized so as to accommodate sleeve 115, 215, 615 or 915 (shown in FIGS. 1, 2, 6, and 9 respectively). The vertical post 1105 may also include a lock 320 or other securing means. The adapter sleeve 1110 includes a hole 1135 for placement of a bolt 1115, a nut 1130, washers 1120 and 1125, or other securing means. The vertical post adapter 1100 is removably disposed on a commercially available vehicle rack by placement over a non-standard vertical element 1140 of a commercially available roof rack 1145. The vertical post adapter 1100 is made of a metal such as aluminum, steel, titanium, brass, copper or stainless steel. The vertical post adapter 1100 may also be made of a structural plastic, fiberglass, graphite, and the like. The method of fabricating the vertical post adapter 1100 may use welding, casting, molding, or other methods commonly known to those skilled in the art.

It is, therefore, apparent that there has been provided, in accordance with the various objects of the present invention, an assembly for quickly and easily retaining a ladder to a vehicle rack. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A ladder retaining assembly retaining a multiplicity of ladders to a vehicle rack, wherein said vehicle rack has a first horizontal member and a first vertical member attached to an end thereof, a pair of facing U-shaped brackets mounted on opposite sides of the first horizontal member to define therewith first and second hollow vertical members, wherein said ladder retaining assembly comprises: a pair of spaced vertical rails forming a channel therebetween and interconnected at their upper ends by a first end of a horizontally extending attachment member, a vertically extending sleeve attached to a second end of the attachment member, said pair of vertical rails disposed within respective said first and second hollow vertical members and capturing the rungs of said multiplicity of ladders within said channel, said first vertical member being received within the sleeve, said sleeve and said first vertical member having aligned apertures receiving a locking means therein for retaining the retaining assembly to the vehicle rack.

* * * * *